(12) United States Patent
Fried (10) Patent No.: US 11,564,515 B2
(45) Date of Patent: Jan. 31, 2023

(54) DISHWARE HOLDER SYSTEMS AND METHOD

(71) Applicant: Brian Fried, Melville, NY (US)

(72) Inventor: Brian Fried, Melville, NY (US)

( * ) Notice: Subject to any disclaimer, the term of this patent is extended or adjusted under 35 U.S.C. 154(b) by 0 days.

(21) Appl. No.: 17/357,888

(22) Filed: Jun. 24, 2021

(65) Prior Publication Data
US 2022/0053955 A1 Feb. 24, 2022

Related U.S. Application Data

(63) Continuation-in-part of application No. 16/237,150, filed on Dec. 31, 2018, now abandoned.

(51) Int. Cl.
*A47G 19/08* (2006.01)
*A47J 47/16* (2006.01)

(52) U.S. Cl.
CPC .............. *A47G 19/08* (2013.01); *A47J 47/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,054,245 A | * | 9/1936 | Cummins | B21D 51/16 219/104 |
| 2,672,741 A | * | 3/1954 | Bernhardt | A47G 23/08 220/23.4 |
| 2,862,627 A | * | 12/1958 | Mizanty | A47G 19/08 211/163 |
| 3,441,003 A | * | 4/1969 | Lister | A01K 5/0114 43/121 |
| D216,215 S | * | 12/1969 | Sweft | D7/505 |
| 3,951,079 A | * | 4/1976 | Tolleson | A47F 5/02 108/94 |
| 4,790,503 A | * | 12/1988 | Pohler | A47J 47/16 248/176.1 |
| 4,966,099 A | * | 10/1990 | Arney | A01K 5/0142 43/132.1 |
| 5,014,865 A | * | 5/1991 | Sauber | A47G 19/2255 215/377 |
| 5,474,206 A | * | 12/1995 | Herring, Sr. | A47J 43/0727 220/636 |
| 5,526,773 A | * | 6/1996 | Richardson | A01K 5/0135 248/156 |
| 5,619,952 A | * | 4/1997 | Walker | A01K 5/0142 119/61.53 |
| 5,894,944 A | * | 4/1999 | Swift | A47G 23/08 211/133.4 |
| 6,167,840 B1 | * | 1/2001 | White | A01K 5/0142 119/72 |
| 6,688,485 B1 | * | 2/2004 | Lauer | A47G 19/08 220/636 |

(Continued)

*Primary Examiner* — Monica E Millner (57) ABSTRACT

A bowl holder including a base for supporting the device on a surface and a holder for receiving a bowl on top of the device. The base may include a plurality of support legs and a threaded aperture in the center of the base. The holder may include a threaded shaft which engages the threaded aperture in the base. The threaded shaft may be placed vertically so that rotating the holder causes it to raise or lower on the threads. The bowl holder is useful for supporting a bowl and adjustably raising the bowl's height above a table or countertop.

11 Claims, 5 Drawing Sheets

(56) References Cited

U.S. PATENT DOCUMENTS

| | | | | |
|---|---|---|---|---|
| 6,860,229 | B1* | 3/2005 | Craft | A01K 5/0142 |
| | | | | 119/61.5 |
| 7,422,120 | B1* | 9/2008 | Fried | A47J 43/22 |
| | | | | 210/473 |
| 10,180,152 | B2* | 1/2019 | Green | A01K 5/0135 |
| 2002/0170868 | A1* | 11/2002 | Morgan | A47G 23/08 |
| | | | | 211/163 |
| 2009/0057252 | A1* | 3/2009 | Eckenrode | A47G 23/08 |
| | | | | 211/151 |
| 2010/0237030 | A1* | 9/2010 | Cass | A47J 47/16 |
| | | | | 211/70 |
| 2011/0220599 | A1* | 9/2011 | Siahpush | A47F 5/02 |
| | | | | 211/85.4 |
| 2011/0220767 | A1* | 9/2011 | Stewart | A47G 19/00 |
| | | | | 248/205.8 |
| 2012/0103999 | A1* | 5/2012 | Weidner | A47G 19/10 |
| | | | | 220/574 |
| 2014/0291472 | A1* | 10/2014 | Leung | A47G 33/1206 |
| | | | | 248/524 |

* cited by examiner

DISHWARE HOLDER SYSTEMS AND METHOD

This application is a continuation-in-part of U.S. patent application Ser. No. 16/237,150, filed on Dec. 31, 2018, the entire contents of which are incorporated by this reference.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of tableware of existing art and more specifically relates to dish supports.

RELATED ART

Dishware may be used to serve food on in modern society. It is common for individuals to rest dishware on a surface while dining, particularly on a table or countertop. Using such surfaces to eat upon makes dining more convenient and reduces the likelihood of spills. However, sometimes such available surfaces are at an inconvenient height to eat upon, such as when dining on a low coffee table. Such situations may also encourage eating habits which are seen as rude or messy, especially as the distance between a diner and the dishware increases. Low eating surfaces may force a diner to stoop down to eat, causing discomfort as well as causing the diner to appear uncouth. A diner may wish that the surface height be adjustable. In addition, some users may physically require dishware to be raised in order to be able to dine safely and comfortably. In particular, elderly individuals may be unable to use lower eating surfaces due to medical problems. Likewise, small children may be unable to reach an eating surface they are seated at. In these cases, the eating surface height may be completely unsuitable. Dishware may leave condensation on the surface on which it resides which is not ideal. A suitable solution is desired.

U.S. Pat. No. 6,971,613 to Leonard Shendelman relates to a plate stand. The described plate stand includes a plate which is detachably mounted on a portable support capable of holding a beverage and other accessories, especially eating utensils.

SUMMARY OF THE INVENTION

In view of the foregoing disadvantages inherent in the known dish support art, the present disclosure provides a novel dishware holder system. The general purpose of the present disclosure, which will be described subsequently in greater detail, is to provide an effective and efficient dishware holder system.

The bowl holder may include a base for supporting the device on a surface (such as a table, counter or the like) and a holder for receiving a bowl (or plate or the like dishware) on top of the device. The base may include a plurality of support legs and a threaded aperture (certain versions may not have threading and use suitably equivalent means for providing adjustability) in the center of the base. The holder may include a threaded shaft which engages the threaded aperture in the base. The threaded shaft may be placed vertically so that rotating the holder causes it to raise or lower on the threads. The holder may include a plurality of bowl supporting members which a bowl may rest upon.

In use, the bowl-holder base may be placed upon a level surface, such as a dining table or countertop. A bowl or similar object may be placed on the holder (dishware engager) attached to the base. The holder may then be spun, causing the threads to raise or lower the holder relative to the base. In this way, the device may be shortened or lengthened vertically, thereby raising or lowering a bowl which is placed on the holder. For example, as the holder is turned by a user in one direction, the threaded shaft of the holder will turn within the threaded aperture of the base, causing the threaded assembly to convert the rotary motion of the holder into linear movement between the holder and the base. A user may eat from the bowl at a desired height, improving the convenience of dining. This functionality is particularly advantageous to young or elderly individuals, who may experience difficulty in adjusting their own height to that of a dinner bowl during a meal. The bowl holder may also be advantageous in eating on surfaces not normally suitable for eating, such as a low coffee table. In some instances, the bowl holder may be useful for additional applications, such as supporting a plate, pitcher, cup, or other type/form of dishware. The holder may be suitable for supporting multiple types of dishware without modification.

A dishware holder system is disclosed herein; the dishware holder system in a preferred embodiment comprising a holder assembly including a base having a plurality of legs (one or more), and a receiver; a dishware engager including a stem, and an engager-member having a top-surface, and a bottom-surface. As such the holder assembly comprises in functional combination the base and the dishware engager. The stem of the dishware engager is able to engage with the receiver such that the dishware engager is able to maintain a position above the base in an in-use condition suitable for mounting dishware thereon. The dishware engager is able to be adjusted in relation to the base. The engager-member is defined by the top-surface and the bottom-surface and forms a thickness therebetween, wherein the engager-member is concave in preferred embodiments to match a contour of the bottom of a bowl. The engager-member is preferably integral with the stem to form the dishware engager as a one-piece construction.

The stem is threaded in preferred embodiments, the receiver is also threaded such that the stem and the receiver are able to be screw-manipulated in relation to each other to adjust a relative position of the dishware engager and the planar surface. The receiver (aperture) is center-positioned to the base so as to maintain suitable balance and stability during use. The engager-member preferably comprises wings, wherein the wings comprise wing-tips providing mounting nodes for a bottom of the dishware and alternately the top-surface of the engager-member is configured for use to nestably-engage and hold the dishware. In this way the device is functional for use with different dishware and dishware of different shapes and sizes.

The base preferably comprises a flat-top upon which the engager-member is able to rest upon, wherein the plurality of legs preferably comprises four legs (exactly or more or less); the plurality of legs converge to the receiver; the plurality of legs forming the flat-top of the base, and wherein the plurality of legs are configured for stable positioning of the holder assembly on a planar surface permitting the dishware to be positioned on a plane above the planar surface during the in-use condition. The device may comprise plastic, or wood in preferred embodiments. Alternate embodiments may comprise any suitable equivalent material. Rubber may be used inside the bowl-holder area, at the top for plate and also under the legs for additional support.

A method of use for the dishware holder system is also disclosed herein, the method comprising the steps of providing a holder assembly including a base having a plurality of legs, and a receiver, a dishware engager including a stem, and an engager-member having a top-surface, and a bottom-surface; setting an item of dishware on the dishware engager (with or without food therein), and adjusting elevation of the dishware in relation to a planar surface that the holder assembly is sitting on; the step of adjusting the dishware may comprise screw-threading up and alternately down, the screw-threading occurring between the receiver and the stem.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which go with the written portion of this specification illustrate embodiments and methods of use for the present disclosure, a dishware holder system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a dish support means and more particularly to a dishware holder system as used to improve the proximity of food to the user for eating and/or serving.

Generally, the present invention comprises a base; the base may include a plurality of base supports (legs) distributed such that the assembly is stably supported on a level planar surface and has a sufficiently wide base (footprint) such that the assembly may not be easily knocked over. In a preferred embodiment, the base may include four such legs, spaced evenly about the assembly. The base may further include a joining member integrated into the center of the plurality of base supports and a threaded aperture (receiver) disposed in the center of the joining member such that the mouth of the aperture faces downwardly toward the planar surface upon which the base rests. The threaded aperture is suitable for accepting a threaded shaft (stem) and may have a coarse thread pitch to facilitate ease of rotation for adjustment. The joining member may be placed at the top of the plurality of base supports and may be parallel to the level surface upon which the base sits. The joining member of the base may further include a tube integrated into the joining member for lengthening the threaded aperture and adding structural integrity to the threaded interface between the holder and the base.

The holder may include a plurality of bowl supports, a joining member integrated into the plurality of bowl supports, and a threaded shaft for engaging the threaded aperture of the base. The plurality of bowl supports extends outwardly and upwardly from the joining member such that they may engage and support a bowl placed on top of the holder. In a preferred embodiment, the holder may include four such supports (wings), spaced evenly about the assembly. The plurality of bowl supports may be curved as to cause a concave void in between the plurality of bowl supports suitable for receiving the spherical shape of a bowl. The bowl may be able to cool quicker and the design lends itself to not catching food or liquid if some is dribbled. The device is easy to clean and use.

Referring now to the joining member; the joining member of the holder may include a flat surface suitable for the base of the bowl to rest upon. The combination of the plurality of bowl supports and the joining member of the base provide a concavity conforming to the general shape of a bowl. The threaded shaft may extend vertically and downwardly from the joining member of the holder, being perpendicular to the joining member. The threaded shaft may also be integrated into the joining member. The threaded shaft may have a coarse thread pitch matching that of the threaded aperture of the base, the thread pitch being coarse enough that turning the threaded shaft of the holder within the threaded aperture of the base causes the holder to raise or lower relative to the base at a substantial rate. The threaded shaft may be long enough to raise or lower the holder relative to the base by several inches at minimum.

The base of the bowl holder rests on a level surface such as a table or countertop. The holder of the bowl holder is fastened to the base by threading the threaded shaft of the holder into the threaded aperture (receiver) of the base. The holder is rotated to adjust the bowl holder to a desired height, and a bowl is placed between the plurality of bowl supporting members of the holder. In this way, the bowl is supported at a desired height suitable for use in dining by a user.

Referring now more specifically to the drawings by numerals of reference, there is shown in FIGS. 1-4, various views of a dishware holder system 100.

Figure 1:
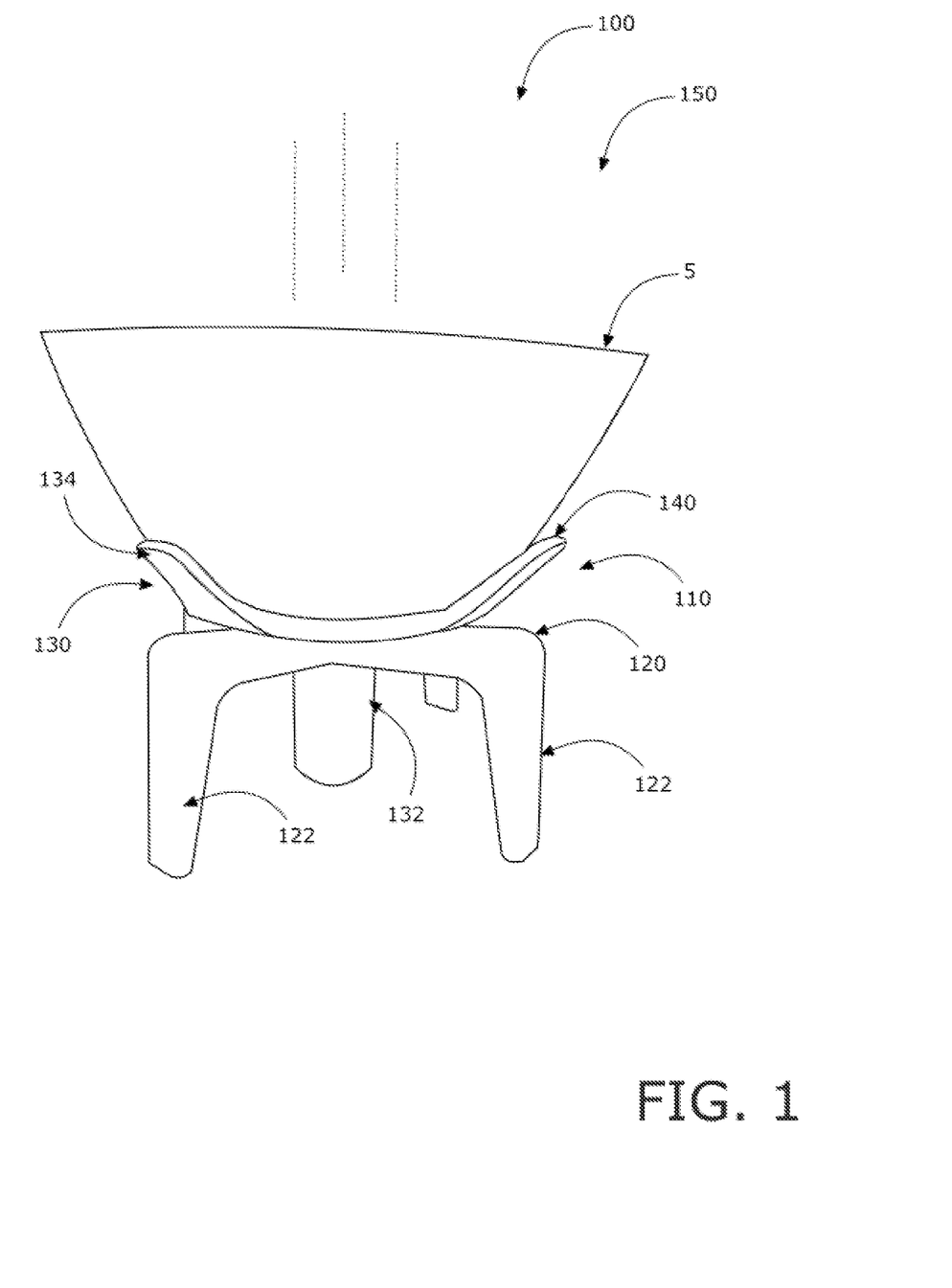
FIG. 1 is a perspective view of the dishware holder system during an 'in-use' condition, according to an embodiment of the disclosure.

FIG. 1 shows a dishware holder system 100 during an 'in-use' condition 150, according to an embodiment of the present disclosure. Here, the dishware holder system 100 may be beneficial for use by a user to adjust positioning of dishware 5 in relation to the user for serving and/or eating therefrom. As illustrated, the dishware holder system 100 may include a holder assembly 100 including a base 120 having at least one leg 122 (preferably a plurality of legs 122), and a receiver 124, a dishware engager 130 including a stem 132 (preferably comprising a threaded shaft), and an engager-member 134 having a top-surface 136, and a bottom-surface 138. The holder assembly 110 comprises in functional combination the base 120 and the dishware engager 130 (holding/supporting/mounting means).

The stem 132 of the dishware engager 130 is able to engage with the receiver 124 such that the dishware engager 130 is able to maintain a position above the base 120 in an in-use condition 150 suitable for mounting dishware 5 thereon, wherein the dishware engager 130 is able to be adjusted in relation to the base 120. The engager-member 134 is defined by the top-surface 136 and the bottom-surface 138 and forms a thickness therebetween. The plurality of legs 122 is/are configured for stable positioning of the holder assembly 110 on a planar surface permitting the dishware 5 to be positioned on a plane above the planar surface (table top surface or other) during the in-use condition 150. The stem 132 may be threaded (FIGS. 2 & 4); the receiver 124 also threaded in these embodiments such that the stem 132 and the receiver 124 are able to be screw-manipulated in relation to each other (FIG. 2 indicates movement via directional arrow) to adjust a relative position of the dishware engager 130 and the planar surface. In this way the user is able to move his/her food closer or further via adjustment.

The engager-member 134 is concave in preferred embodiments (non-concave in alternate embodiments); the engager-member 134 is integral with the stem to form the dishware engager 130 as a one-piece construction. The engager-member 134 may comprise wings 140; the wings 140 may comprise wing-tips 142 providing mounting nodes for a bottom of the dishware 5.

Figure 2:
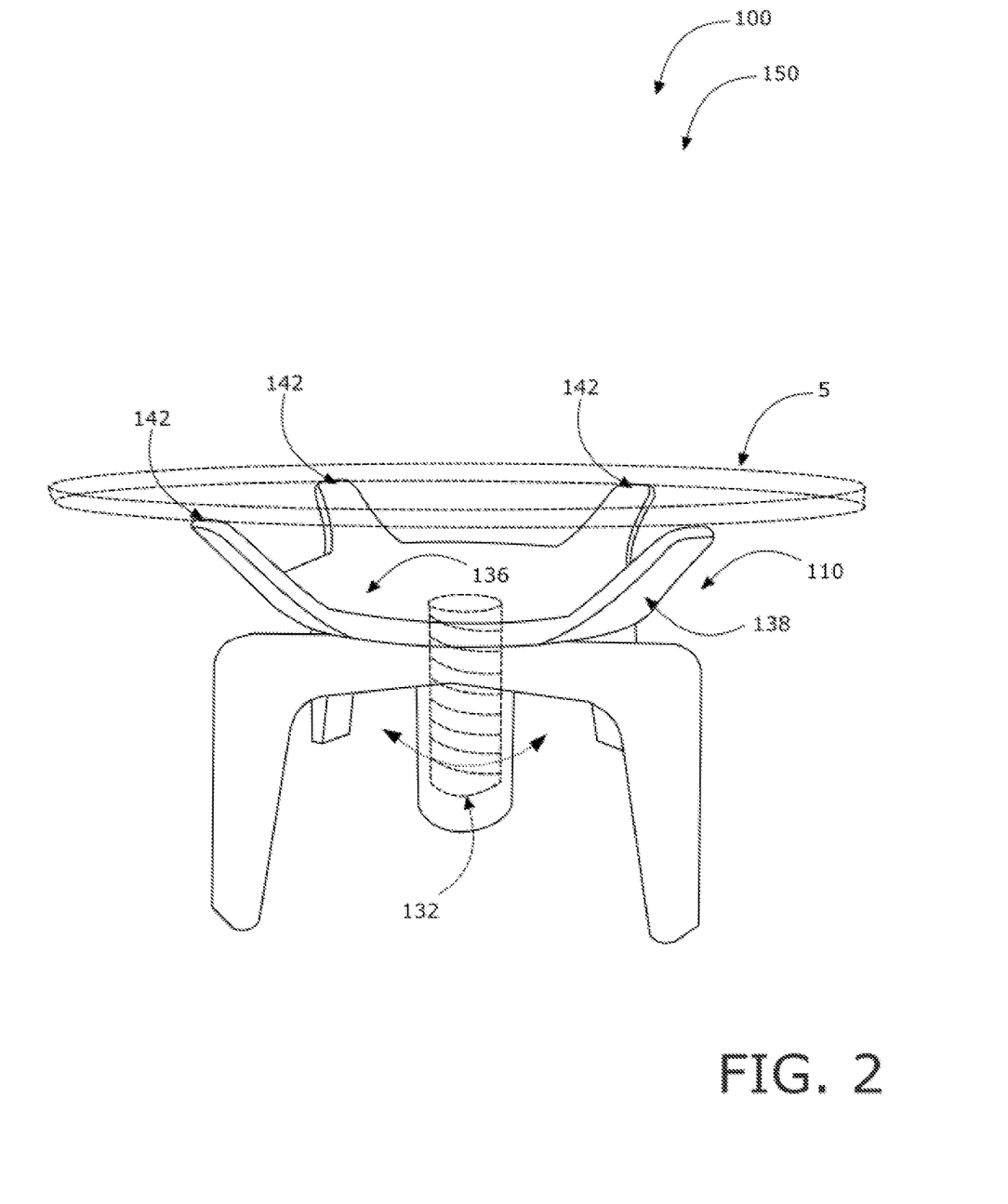
FIG. 2 is a perspective view of the dishware holder system of FIG. 1, with a different item of dishware in an in-use condition.
Figure 3:
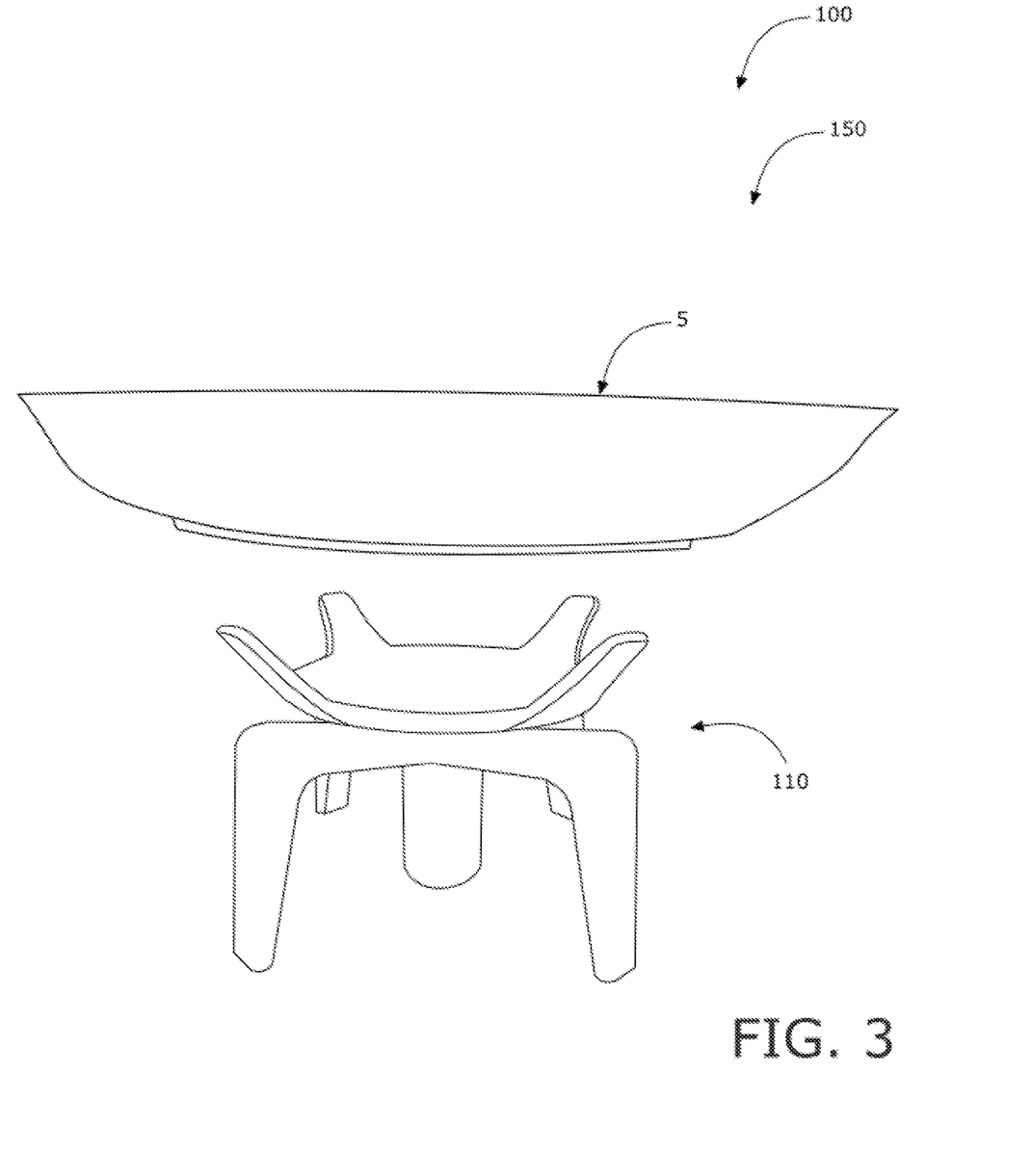
FIG. 3 is a perspective view of the dishware holder system of FIG. 1, according to an embodiment of the present disclosure.
Figure 4:
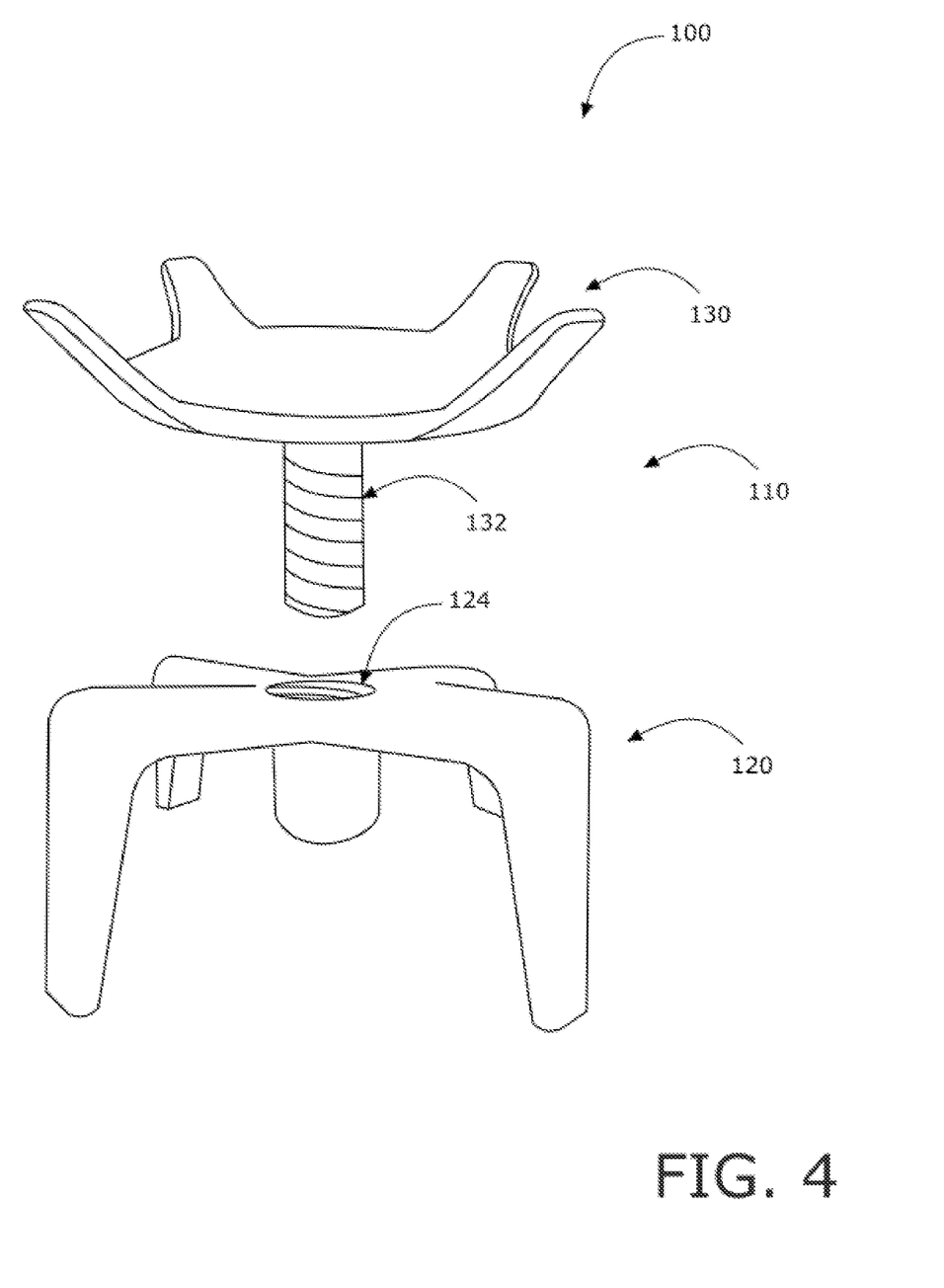
FIG. 4 is an exploded view of the dishware holder system of FIG. 1, according to an embodiment of the present disclosure.

It should be noted that the dishware 5 described herein may comprise a bowl; a non-bowl (a plate or serving-tray or the like as shown in FIGS. 2-3). Non-food serving bowls may be held such as water pitchers or display items may be held thereon.

The top-surface 136 of the engager-member 134 is useful (configured to) to nestably-engage and hold the dishware 5; wherein the base 120 comprises a flat-top upon which the engager-member 134 is able to rest upon. The plurality of legs 122 preferably comprises four legs 122; the plurality of legs 122 converging to the receiver 124, the plurality of legs 122 forming the flat-top of the base 120. The receiver 124 is center-positioned to the base 120. In some embodiments of the dishware holder system 100 the stem 132 comprises a stabilizer-leg extending close in proximity to the planar surface (FIG. 2). Other embodiments may comprise a shorter stem 132 (as shown in exploded view FIG. 4).

According to one embodiment, the dishware holder system 100 may be arranged as a kit. In particular, the dishware holder system 100 may further include a set of instructions. The instructions may detail functional relationships in relation to the structure of the dishware holder system 100 such that the dishware holder system 100 can be used, maintained, or the like, in a preferred manner.

Figure 5:
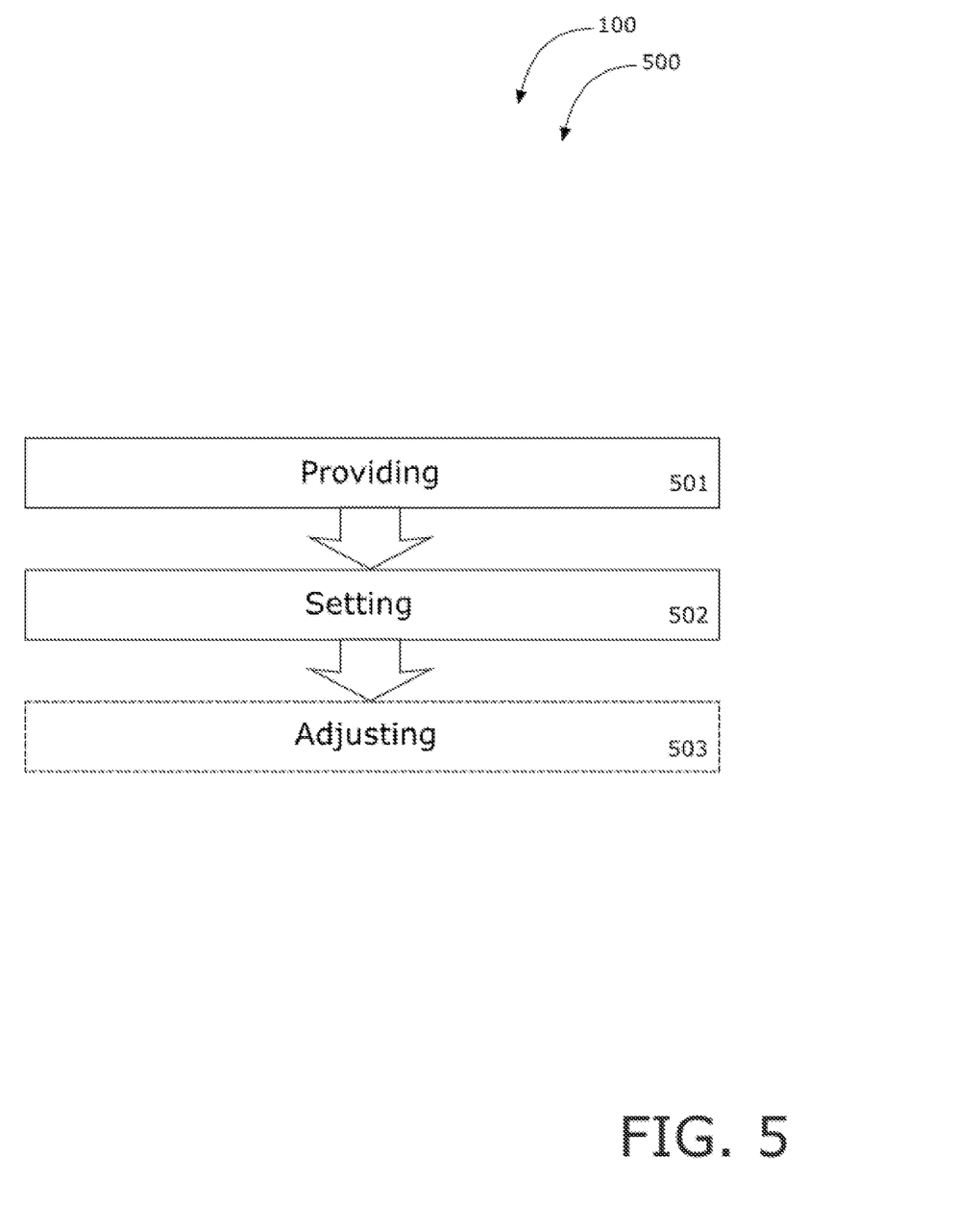
FIG. 5 is a flow diagram illustrating a method of use for the dishware holder system, according to an embodiment of the present disclosure.

FIG. 5 is a flow diagram illustrating a method for using 500 the dishware holder system 100, according to an embodiment of the present disclosure. In particular, the method for using 500 the dishware holder system 100 may include one or more components or features of the dishware holder system 100 as described above. As illustrated, the method for using 500 may include the steps of step one 501, providing a holder assembly including a base having a plurality of legs, and a receiver, a dishware engager including a stem, and an engager-member having a top-surface, and a bottom-surface; step two 502, setting an item of dishware on the dishware engager; step three 503, adjusting elevation of the dishware in relation to a planar surface that the holder assembly is sitting on; the step of adjusting the dishware may comprise screw-threading up and alternately down, the screw-threading action occurring between the receiver and the stem.

It should be noted that step 503 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for use of dishware holder system 100 are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A dishware holder system comprising:
    a holder assembly including a dishware engager including a stem and an engager-member, and
    a base with a receiver bored into the base and open at a top end,
    wherein the stem engages the receiver supporting the dishware engager above the base;
    wherein the dishware engager is adjustable in relation to the base;
    wherein legs stabilize the holder assembly;
    wherein the dishware engager is adapted to hold a dishware;
    wherein at least some of the dishware engager has a top surface separated from a bottom surface of a dishware;
    wherein the base comprises the legs extending from a bottom of the base; and
    wherein the receiver protrudes from a bottom of the base a range between zero and the length of the legs.

2. The dishware holder system of claim 1, wherein no part of the stem contacts the dishware during use.

3. The dishware holder system of claim 2, wherein no protrusion from the dishware forms part of a joint.

4. The dishware holder system of claim 3, wherein the system contains no provision to attach to a dishware as a plate.

5. The dishware holder system of claim 4, wherein the engager-member comprises wings.

6. The dishware holder system of claim 4, wherein the engager-member is not concave.

7. The dishware holder system of claim 4, wherein the dishware is a bowl.

8. The dishware holder system of claim 4, wherein the dishware is a plate.

9. The dishware holder system of claim 5, wherein the wings comprise wing-tips providing mounting nodes for the dishware to sit across.

10. The dishware holder system of claim 1 wherein the engager is vertically adjustable in relation to the base.

11. The dishware holder system of claim 1 wherein the stem comprises threads and the engager is vertically adjustable in relation to the base by rotating the stem.

* * * * *